Reissued Dec. 14, 1937 Re. 20,578

UNITED STATES PATENT OFFICE 20,578

METHOD OF TREATING FOOD PRODUCTS AND RESULTING PRODUCT

Samuel Henry Ayers and Charles W. Lang, Philadelphia, Pa., assignors, by mesne assignments, to Crown Can Company, Philadelphia, Pa., a corporation of Pennsylvania No Drawing. Original No. 2,054,066, dated September 15, 1936, Serial No. 629,719, August 20, 1932. Application for reissue September 2, 1937, Serial No. 162,210

15 Claims. (Cl. 99—155)

This invention relates to the art of packing products generally classified in the fruit industry. In particular, it relates to methods for treating and packaging such products and to the resulting packaged products.

The present invention is applicable to fruit products such as the juices of citrus fruits, including tangerines, kumquats, tangerine limes, limes, lemons, oranges, grapefruit, tangelo, citron, grapefruit pomolo; juices of other fruits including apple cider and grape and berry juices; and juices of pulpy fruits such as those obtained from pineapple, cantaloupe, peaches, tomatoes and the like.

In the interest of brevity and certainty the expression "fruit juices" as used herein is to be read and understood as meaning and referring to any one or all of the foregoing or analogous substances, unless indicated to the contrary.

The present invention may be broadly described as including the steps of suitably preparing and placing fruit juices in suitable containers, subjecting the juices in the containers to the sterilization action of steam under such conditions that the juices will be commercially sterilized without the development of any noticeable cooked taste, closing the containers by means of the steam pressure therein and finally permanently sealing the containers with steam therein under greater than atmospheric pressure.

Many variations of these important steps may be made, and many additional steps may, separately or collectively, be combined with the foregoing steps or variations thereof. For example, the fruit juices are preferably concentrated before sterilization sufficiently to compensate for the diluting action of the steam which may condense in the juice and container during and after sterilization. The juices may also be partially degassed preliminary to sterilization. They may be, and preferably are, brought to a temperature between about 120° F. and about 140° F. before sterilization. They may be, and preferably are, subjected to vacuumization between about 16" and 28" of mercury just prior to sterilization, and, after sterilization and before final sealing of the containers, some of the steam pressure may be released from the container with resultant increased vacuum in the finally sealed container. After the container is finally sealed, it and its contents may be cooled at different rates. For example, such temperature may be reduced to below about 110° F. in about two minutes' time.

Fruit juices treated according to the present invention are characterized by the fact that they are commercially sterile, are maintained in the sealed container under a high vacuum ranging from about 16" to about 26", possess no foreign or cooked taste, may be substantially free from rind oil, may contain no added sugar, have taste and flavor substantially the same as fresh juice of like fruit naturally ripened to the same extent, and, in the case of juices in which there is a tendency to separation of the liquid and heavier material, this tendency is considerably diminished so that no separation of clear liquid takes place. Such juices are further characterized by the fact that they are sealed with a minimum amount of free air therein and the gas content in the sealed container contains materially less total gas, including carbon dioxide and nitrogen, than is present in corresponding juices in the same size container and treated by methods heretofore in use.

For example, orange juice, packaged according to the present method in a No. 1 size can having a minimum juice content of about nine and one-half fluid ounces, contained less than 5 cc. of total gas composed of less than 1¼% of $CO_2$ with substantially all the remainder thereof being nitrogen. Grapefruit juice similarly packaged gave substantially the same results. This gas content is less than one-half the amount found in the same size containers of orange and grapefruit juices packaged according to other methods in use at the present time, and in the latter juices the ratio of the nitrogen to the $CO_2$ varied widely and was higher than in the packages containing orange juice treated according to the present invention.

The amount of oxygen existing, at the time of sealing, as free air in the containers of orange juice treated by this invention, if calculated on the basis of the nitrogen found in the container when the foregoing gas examinations were made, was, on the average, less than 50% of the oxygen similarly estimated to have been present in containers of similar size containing orange juice treated by prior methods.

The present invention will be described in considerable detail, so that it may be understood by those skilled in the art. For this purpose, orange juice has been selected, primarily because it is generally recognized as being quite difficult to treat and package in such a manner that the juices will closely correspond in substantially all respects to juices from fresh tree-ripened fruit, altho it is easy to sterilize orange juice to prevent fermentation.

The orange juice is extracted from the fruit in any suitable manner such as by cutting each orange into two halves and then reaming out the pulp. The pulp may be squeezed out if desired, but some rind oil frequently accompanies the juice in such case. Any standard satisfactory screening apparatus may be employed for separating the larger sized pieces of pulp and foreign material from the juice.

The juice may be concentrated to compensate for the dilution resulting during sterilization. The concentration is preferably carried out by subjecting the screened juice at low temperature to a high vacuum. It has been found that in continuous operation about 120 gallons of orange juice per hour may be concentrated to the extent of about 10% by passing it thru tubes under a vacuum of from about 26'' to about 28'' of mercury, while the tubes are surrounded with steam at a temperature of about 150° F. This concentration involves the liberation of water vapor from the juice. This liberation may be permitted in such a manner that gases also are liberated and separated from the juice. Conveniently, the juice which has been heated as aforesaid, may be discharged into a chamber maintained under the high vacuum mentioned, and the water vapor and gases removed therefrom while the juices may be pumped out for subsequent treatment.

The concentrated juice is then placed in suitable containers, as by means of an ordinary filling machine, and the containers, after being provided with suitably valved covers, are heated so that the contents attain a temperature between about 120° F. and about 140° F. Then the juice is ready for sterilization.

Preferably the containers, with the orange juice therein at between about 120° F. and 140° F., are subjected to a vacuum of between about 16'' and about 27'' of mercury or more preliminary to sterilization. While this vacuumizing treatment may be omitted in some instances, it is preferable to use it in most cases. Where vacuumizing is employed, the sterilization follows immediately thereafter. Steam ranging in temperatures between about 240° F. and about 260° F. is admitted into the container and is caused to penetrate into and to pass thru the juice thereby coming into contact with substantially all portions of the juice in the container, and causing violent agitation of the juice, as may conveniently be done, passing the steam up thru the liquid. The steam sterilizes the juice, raising the temperature thereof to between about 212° F. and about 225° F. and builds up a pressure within the container sufficient to close the valve when the connection between the container and the steam supply system is broken. The container is closed by means of steam pressure therewithin and is thereafter permanently sealed. Between preliminary closing and permanent sealing, the container may be vented, if desired, to release some of the steam pressure and gases, with the result that an increased vacuum will be present in the finally sealed, cold container.

After the sterilization step has been completed, the container and its contents may be quickly cooled as by spraying water onto the container, immersing it in cold water, or by other suitable means. Preferably, the temperature of the container and its contents is reduced within about two minutes' time to below about 110° F.

There are several factors which should be correlated with one another if the best results are to be obtained. These factors include the concentration of the juice, the temperature of the fruit juice preliminary to sterilization, the extent of vacuumization, and the temperature, pressure and amount of steam used during sterilization. In general, the higher the preheating temperature used, the lower may be the temperature and pressure of the steam, or the smaller may be the amount of steam required at a higher temperature and pressure for sterilization. The greater the amount of steam employed, the greater will be the amount of steam condensation in the container. The temperature and pressure of steam required to bring the juice to the predetermined temperature depends, to some extent, on the amount of vacuum or the absolute pressure existing in the container just before the steam is admitted. The amount of vacuum in the finally sealed container likewise depends to some extent on the amount of preliminary vacuum before sterilization, and the amount of steam and gases released from the container after sterilization. Continuous production is made possible by the proper correlation of these steps and uniformity and high quality of results also attend such correlation.

Accordingly, a satisfactory correlation of these factors, for orange juice in particular, may be described as follows: The orange juice, concentrated continuously and at a rate suited to later operations to about 90% of its original volume, is preheated to between about 120° F. and about 140° F. in the final container, the containers are vacuumized between about 16'' and about 28'' of mercury. Steam at temperatures ranging between about 260° F. and about 240° F. is admitted into the thus vacuumized containers and contacts with substantially all portions of the juice and heats the same to between about 212° F. and about 225° F. within a period of around about fifteen seconds. The vacuum existing in the finally sealed containers at room temperature will range between about 16'' and about 26'' of mercury, but release of some of the pressure after the container is first closed and before it is finally sealed will insure vacua in the upper portions of this range.

It is important that the containers should be provided with means, such for example, as valves, thru which gases may be withdrawn from the container and thru which steam under pressure may be introduced into the container and its contents. Such a means may conveniently be capable of being closed by means of steam pressure in the container, and should be easily and readily sealed permanently against leakage of gases into or out of the container. Satisfactory results have been obtained with valved containers like those shown in U. S. Patent No. 1,728,533.

One form of apparatus which has been found satisfactory for practicing the present invention, is shown, described and claimed, in the copending application of John Mills, Serial No. 629,678, filed August 20, 1932.

Having thus described the present invention so that those skilled in the art may be enabled to practice the same, what is desired to be secured by Letters Patent is defined in what is claimed.

What is claimed is:

1. The method of treating fruit juices which includes the steps of concentrating a quantity of fruit juice to about 90% of its original volume, placing such concentrated fruit juice in a plurality of final containers, subjecting the fruit juice in the final containers and at a suitable temperature to the action of steam passing therethru at a sterilizing temperature, and sealing all the containers with substantially the same pressure therein.

2. The method of treating fruit juices which includes the steps of agitating a partially concentrated fruit juice in a final container and at a suitable temperature by passing steam thereinto under conditions adapted to render the juice commercially sterile, the steam condensing in the juice being sufficient approximately to restore the partially concentrated fruit juice to its unconcentrated volume, closing and finally sealing the container.

3. The method of treating fruit juices which includes the steps of concentrating a fruit juice at low temperature under a vacuum, placing the concentrated fruit juice in final containers, passing steam under pressure into the fruit juice in the containers while the fruit juice is at a suitable temperature thereby agitating and heating the fruit juice, permitting steam pressure in the container to close the container and sealing the container permanently with steam therein under greater than atmospheric pressure.

4. The method of treating fruit juices which includes the steps of concentrating a fruit juice at a low temperature and under high vacuum, placing such concentrated fruit juice in final containers and while such juice is at a suitable temperature, exhausting gases from the container under high vacuum, immediately thereafter agitating and heating the juice in the containers by passing thereinto steam under high pressure, closing the containers by permitting the steam pressure in the container to close the latter, and sealing the containers permanently with substantially the same high steam pressure in all the containers.

5. The method of treating fruit juices which includes the steps of concentrating a fruit juice at a low temperature and under high vacuum, placing such concentrated fruit juice in final containers and while such juice is at a suitable temperature, exhausting gases from the container under high vacuum, immediately thereafter agitating and heating the juice in the containers by passing thereinto steam under high pressure, closing the containers by permitting the steam pressure in the container to close the latter, sealing the containers permanently with substantially the same high steam pressure in all the containers, and quickly cooling the containers and their contents below about 110° F.

6. The continuous method of treating fruit juice which comprises continuously performing the steps of extracting the juice of a fruit, screening the extracted juice to separate out the heavier pulpy particles and foreign materials, and concentrating the screened juice to about 90% of its original volume at low temperature under high vacuum, then performing the steps of delivering the concentrated juice to the final juice containers, heating such containers and their contents to raise the temperature of the latter to between about 120° F. and 140° F., then performing on each container successively the steps of exhausting gases from the container under high vacuum, passing steam under high pressure through the juice in the container immediately after the exhaustion of gases therefrom thereby agitating and heating the juice in the container to between about 212° F. and about 225° F., interrupting the introduction of steam into the container and permitting the steam pressure in the container to close each container with substantially a predetermined steam pressure therein, permanently sealing the container against leakage of steam out of the container promptly after the latter is closed and cooling the contents of the container to below about 110° F. within a period of about two minutes after the container has been permanently sealed.

7. In the process of treating fruit juices in which gases are removed from a final container partly filled with a fruit juice at a suitable temperature and concentration, followed by passage of steam under pressure thru such fruit juice and this in turn followed by permanent sealing of the container with steam therein under high pressure and final cooling of the contents, the steps of correlating the temperature of the fruit juice in the container, the amount of vacuum applied to the container, and the temperature, pressure and amount of steam introduced into the fruit juice in the container, so that the fruit juice is heated by the steam to a temperature sufficient for partial sterilization of the fruit juice within about thirty seconds' time, and so that, when cold, the fruit juice in the container has a volume not exceeding by more than about 10% the volume prior to the above described treatment, is sealed in the final container against gas leakage under a vacuum of above about 16'' of mercury, and the gas content in the container is relatively small with a negligible amount of free oxygen calculated on the basis of the nitrogen present.

8. In the process of treating fruit juices in which gases are removed from the final container partly filled with a fruit juice at a suitable temperature, then steam under pressure is passed through the juice after such removal of gases, and the container is then permanently sealed and its contents cooled, the steps of correlating the temperature of the fruit juices in the container, the amount of vacuum applied to the container, and the temperature, pressure and amount of the steam introduced into the fruit juices, so that the fruit juices are heated by the steam to between about 212° F. and about 225° F. within about fifteen seconds' time, and, when cold, the fruit juice in the container has a volume not more than about 10% greater than before the above described treatment, are sealed against gas leakage in the final container under a vacuum of above about 16'' of mercury, and the gas content in the container is relatively small with a negligible amount of free oxygen calculated on the basis of the nitrogen present.

9. Commercially sterile fruit juice under high vacuum in a sealed container and having color, taste, flavor and concentration characteristic of fruit juice which has been extracted from fresh fruit of the same kind and naturally ripened to the same extent, which juice has been concentrated at low temperature under high vacuum to about 90% of its original volume and then treated in the final container by exhaustion of gas from the container under a high vacuum, followed by introduction into the juice in the final container of steam at temperatures between about 240° F. and about 260° F., followed by permanent sealing of the container with a relatively small amount of free air and with steam therein under pressure, the concentration of the juice in the final container at room temperature being substantially that of the juice before it was subjected to the step of concentration.

10. The method of treating liquid food stuffs, particularly fruit juices which includes the steps of concentrating a quantity of liquid food stuff to about 90% of its original volume, placing such concentrated food stuff in a final container, passing steam at a sterilizing temperature into the food stuff in such container, while the food stuff is at a suitable temperature, to exert a sterilizing action on the food stuff and to increase its volume to substantially that of the unconcentrated food stuff and sealing the container with steam pressure therein.

11. The method of treating fruit juices which includes the steps of agitating and rendering commercially sterile a partially concentrated fruit juice at a suitable temperature by passing steam thereinto, the steam condensing in the juice being sufficient approximately to restore the partially concentrated fruit juice to its unconcentrated volume, and finally sealing the juice in a container.

12. The method of treating fruit juices which includes the steps of agitating and rendering commercially sterile a partially concentrated and de-gassed fruit juice at a suitable temperature by passing steam thereinto, the steam condensing in the juice being sufficient approximately to restore the partially concentrated fruit juice to its unconcentrated volume, and finally sealing the juice in a container.

13. The method of treating fruit juices which includes the steps of partially concentrating fruit juice, agitating and rendering commercially sterile the concentrated fruit juice at a suitable temperature by passing steam thereinto, the steam condensing in the juice being sufficient approximately to restore the partially concentrated fruit juice to its unconcentrated volume and finally sealing the juice in a container.

14. The method of treating fruit juices which includes the steps of partially concentrating and de-gassing fruit juice, agitating and rendering commercially sterile the concentrated fruit juices at a suitable temperature by passing steam thereinto, the steam condensing in the juice being sufficient approximately to restore the partially concentrated fruit juice to its unconcentrated volume and finally sealing the juice in a container.

15. The method of treating fruit juices which includes the steps of partially concentrating and de-gassing fruit juices, raising the juice to a suitable temperature in a final container by passing steam thereinto, the steam condensing in the juices being sufficient approximately to restore the partially concentrated fruit juice to its unconcentrated volume, and finally sealing the container.

SAMUEL HENRY AYERS.
CHARLES W. LANG.